United States Patent [19]
Kolmar et al.

[11] Patent Number: 5,879,551
[45] Date of Patent: Mar. 9, 1999

[54] DEVICE FOR DEWATERING SUSPENSIONS

[75] Inventors: Ulrich Kolmar, Pforzheim; Harald Matern, Höfen; Lothar Wenzel, Bretten, all of Germany

[73] Assignee: Gebr, Bellmer GmbH & Co., KG, Niefern-Oschelbronn, Germany

[21] Appl. No.: 687,376
[22] PCT Filed: Nov. 29, 1994
[86] PCT No.: PCT/DE94/01437
§ 371 Date: Jul. 2, 1996
§ 102(e) Date: Jul. 2, 1996
[87] PCT Pub. No.: WO95/15925
PCT Pub. Date: Jun. 15, 1995

[30] Foreign Application Priority Data

Dec. 7, 1993 [DE] Germany .......................... 43 41 580.6

[51] Int. Cl.⁶ .......................... C02F 11/12; B01D 33/04; B01D 33/056
[52] U.S. Cl. .......................... 210/401; 210/405; 210/456; 210/783; 100/118; 241/79; 241/24.11
[58] Field of Search .................................. 210/400, 401, 210/405, 456, 783; 100/118; 241/79, 24.11

[56] References Cited

U.S. PATENT DOCUMENTS

| 432,153 | 7/1890 | Whiting . |
| 2,265,455 | 12/1941 | Serpas . |
| 3,613,564 | 10/1971 | Adamski . |
| 3,951,809 | 4/1976 | Kollmar . |
| 4,147,101 | 4/1979 | Heissenberger . |
| 4,491,521 | 1/1985 | Wenske . |
| 4,557,833 | 12/1985 | Krenmayr . |
| 4,885,088 | 12/1989 | Sbaschnigg . |
| 5,207,907 | 5/1993 | Delons . |
| 5,308,486 | 5/1994 | Heintze . |
| 5,309,829 | 5/1994 | Gahlmann . |

FOREIGN PATENT DOCUMENTS

| 0 103 565 | 9/1983 | European Pat. Off. . |
| 2 673 933 | 9/1992 | France . |
| 3221435 A1 | 12/1983 | Germany . |
| 57-17398 | 1/1982 | Japan . |
| WO 82/02686 | 8/1982 | WIPO . |

OTHER PUBLICATIONS

Patent Abstracts From Japan, unexamined applications, Section C, vol. 6, No. 174, published on 1982, 08 Sep., The Patent Office Japanese Governement; p. 37C123; & JP, A,57087 895 (Hitachi).

Primary Examiner—Thomas M. Lithgow
Attorney, Agent, or Firm—Pillsbury Madison & Sutro

[57] ABSTRACT

A device for dewatering suspensions such as sludge or similar dewaterable goods contains several rollers and filtering webs that follow a sinuous path around the rollers. The width of at least one pressure gap, as well as the force which is applied on the goods to be filtered in this pressure gap, may be adjusted by sliding or swivelling so that the ratio between linear pressure and surface pressure can be adapted to the properties of the goods to be dewatered. By influencing this ratio it is possible from a standard model to cover a wide range of applications by simple and economic means, so that the cost-effectiveness ratio is improved.

25 Claims, 7 Drawing Sheets

DEVICE FOR DEWATERING SUSPENSIONS

BACKGROUND OF THE INVENTION

The invention relates to a device for dewatering suspensions, such as sludge or similar materials which can be dewatered, having a plurality of rollers and two filter bands which are guided around the rollers in an S-shape and enclose the material to be dewatered between them.

It relates in particular to presses with a multitude of pressure rollers, wherein successive drying of the suspension by means of the S-shaped wrapping of the rollers by the filter bands is achieved with an increase in rollers.

Such presses are employed in multitudinous designs, they are all essentially differentiated by the relative association of the successive rollers, their diameter and type of construction and the way of guiding the bands around the rollers, in particular the size of the wrap angle of the filter bands around the individual rollers.

The suspension to be dewatered varies, depending on the area of use, and it is possible to dewater various sludges, such as communal sludge, which in turn show a more or less high degree of previous water removal. The pressing of fruits or parts of fruits is also performed with such filter presses.

In the course of this it has been shown that a certain type of press, i.e. a press with a defined roller configuration and filter band guidance, will as a rule achieve an optimal operational result, i.e. generally a maximum degree of drying with specific suspensions or with specific suspension compositions. Thus, the multitude of structural variants of such presses which are available in the marketplace as a rule also are used to achieve optimum pressing results for specific or specifically set suspensions, whose degree of pre-drying, macro-molecular structure, possibly with the addition of additives, lies within a defined range.

However, the planning and construction of specific press configurations is increasingly elaborate, and such presses are relatively expensive because of the "specialist properties" described.

BRIEF SUMMARY OF THE INVENTION

It is therefore an object of the invention to provide a press of the simplest construction which covers a wide use spectrum by means of simple, quick and thus cost-effective modifications in construction, i.e. that a universally employable press is created by means of a simple basic design of the device in accordance with the invention, which over a wide range provides optimal suspension dewatering with a particularly good cost/benefit ratio.

This object is attained in accordance with the invention in that a device as described at the outset includes a plurality of rollers and two filter bands for enclosing the suspension, the two filter bands being guided along an S-shaped path around the rollers so that each roller is contacted by one of the bands over a respective contact area, the improvement wherein: the plurality of rollers comprise at least one pair of rollers composed of first and second roller; and the device further comprises at least one displacement mechanism coupled to one of the rollers of the at least one pair, the displacement mechanism being movable to displace the one of the rollers of the at least one pair relative to the other one of the rollers of the at least one pair over a path to create a pressing gap of adjustable width between the first and second rollers and a pressing force of adjustable magnitude on the suspension, whereby movement of the displacement mechanism creates an adjustable relation between the dewatering produced in the pressing gap and the dewatering produced in the contact area.

The basic concept of the invention therefore essentially consists in that a basic component of the press consists of a pair of rollers which can be adjusted in relation to each other and which comprise a pressing gap between them. The wrap angle of both rollers of the roller pair is preferably selected to cover 180°.

Such a roller pair allows the simultaneous use of both linear pressing and area pressing for dewatering the suspension, wherein, by means of the adjustable association with each other of the rollers of the roller pair, both the absolute value of this pressing effect and also the ratio between linear pressing and area pressing can be simply set over a wide range.

It has been shown that, depending on the material to be dewatered, specific combinations of linear pressing/area pressing lead to an optimal pressing result, i.e. to a maximum degree of drying. This combination need not be the same for all degrees of drying of the previously dewatered material, i.e. even with a predetermined suspension it may be necessary, for example, to vary the mentioned ratio of linear pressing/area pressing with the increasing degree of dryness of the suspension when passing through several roller pairs, for example in the sense that with an increasing degree of dryness linear pressing plays an increasing role, while area pressing moves into the background, or vice versa.

These possibilities of adjustment to the "dewatering characteristics" of the material of interest or the respective suspension permit an optimization of the pressing result after each roller pair, so that instead of the multitude of rollers provided up to now, three pairs of rollers already lead to very good pressing results for a large portion of industrial or communal applications, which particularly highlights the efficiency of the device in accordance with the invention.

It is of course also possible to place other, known roller arrangements upstream or downstream of arrangements of such pairs of rollers, if specific jobs require this.

In accordance with a preferred design, the pressing gap and the linear pressure exerted by it are set with the aid of a force-actuated pivot arm on which the one roller is held, while the other roller can be tangentially displaced and fixed in place, by means of which the wrap angle and thereby the area pressure, which the two rollers exert in the wrap area on the material to be dewatered, can be set.

However, the variable force actuation of the roller can also simply take place by means of a suitable presetting of the band tension of the filter bands, if a suitable torque is generated on the pivot arm by this.

Several such pairs of rollers can be disposed on a common frame, however, separate structural units can also be employed which are respectively equipped with pivot arms and displacement options for the two rollers, so that such structural units or structural modules can be easily mounted in suitable frames or holding devices of the press and can again be removed, so that in this way an adaptation to the specific dewatering problem is possible with a few manipulations.

A plurality of further advantageous embodiments ensues from the dependent claims. Several such embodiments will now be described in detail with reference to of the drawings.

Figure 1:
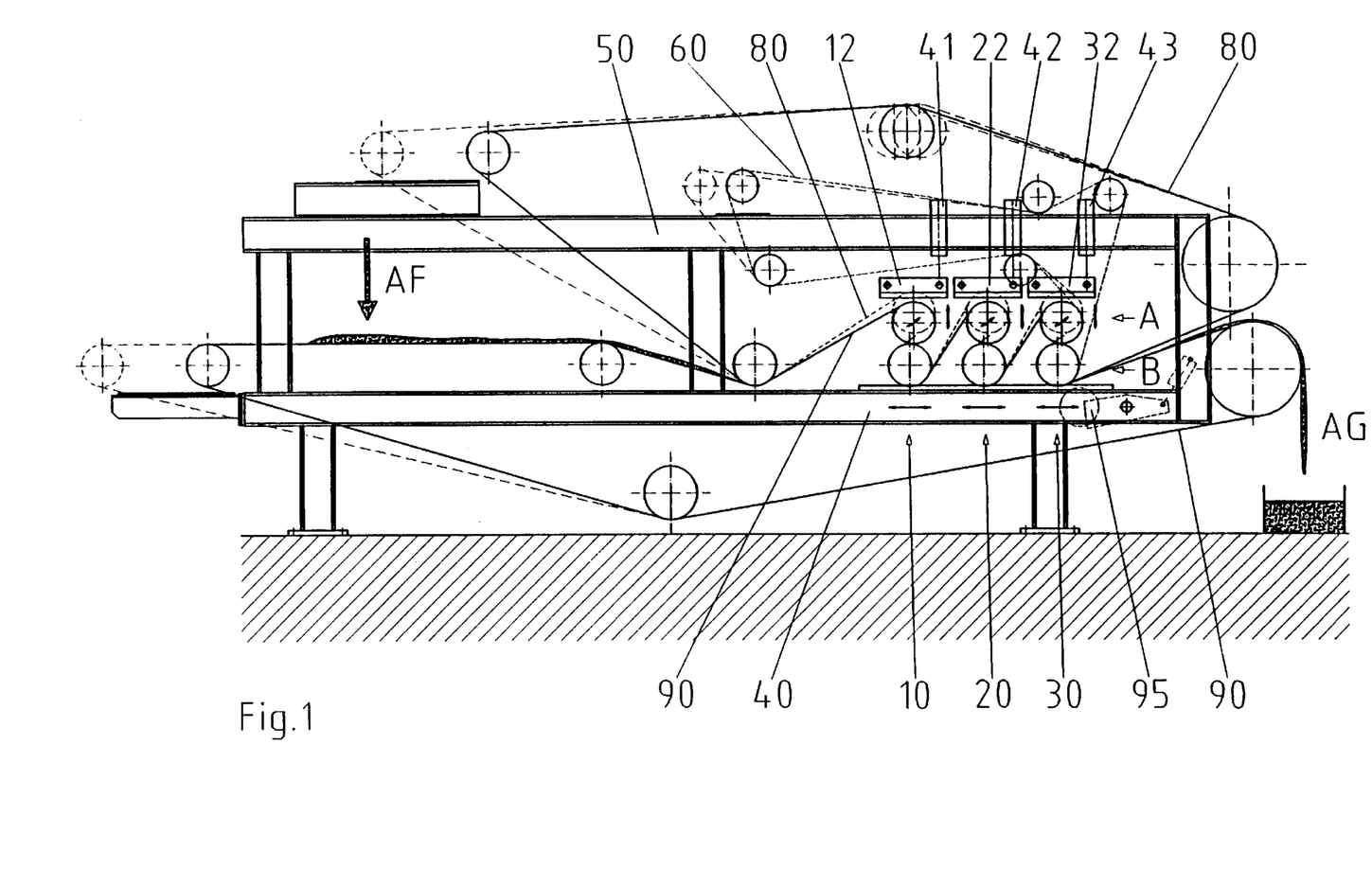
FIG. 1 is a lateral view of a press with a first preferred arrangement of roller pairs.

The press shown in FIG. 1 in section or a lateral view consists in the customary manner of an upper filter band 80 and a lower filter band 90, which are respectively endlessly guided over a plurality of pressure rollers and reversing rollers. The constructive steps for guiding these filter bands individually and for their tension are known from the prior art and need not be described here.

The (possibly pre-dewatered)) material to be pressed is placed on the lower filter band 90 in a feeding station AF, and is subsequently guided through a combination of three pairs of pressing rollers 10, 20, 30, and finally the dewatered material is discharged in a release station AG and conveyed away by suitable means.

Each one of the roller pairs 10, 20, 30 consists of an upper roller . . . A and a lower roller . . . B. In the exemplary embodiment represented, the respectively upper roller . . . A is held on a pivot arm 12, 22, 32, whose one end is connected with the upper frame 50 of the press (not shown), and whose other end is engaged by a device 41, 42, 43 (for example a hydraulic cylinder), which is also fastened on the upper frame 50, and with the aid of which the upper roller . . . A can be pivoted in respect to the respectively lower roller . . . B, wherein in particular the distance between the two rollers, and with it the pressing gap for the two filter bands 80, 90 passed between the two rollers, is defined.

Each one of the lower pressing rollers . . . B can be horizontally displaced by means of suitable horizontal guides, not shown in FIG. 1, i.e. in a direction essentially tangentially in respect to the respectively upper pressing roller . . . A. With the solutions represented in FIG. 1 and the subsequent exemplary embodiments, wrap angles of the filter bands around each roller of at least 180° have been selected in this case. An additional drying band 60 is associated with the last pressing roller pair 30, for example a felt band, as well as an additional drying roller 95. The drying band 60 is used to remove residual moisture on the filter band 80, the drying roller 95 for removing residual moisture from the underside of the filter band 90.

The exemplary embodiment represented is an essentially horizontally operating press, however it can be easily seen that it is also possible to displace the entire press or the arrangement of the roller pairs 10, 20, 30 as a whole or partially into the vertical, depending on how the spatial requirements in the actual case of application demand it.

Figure 2:
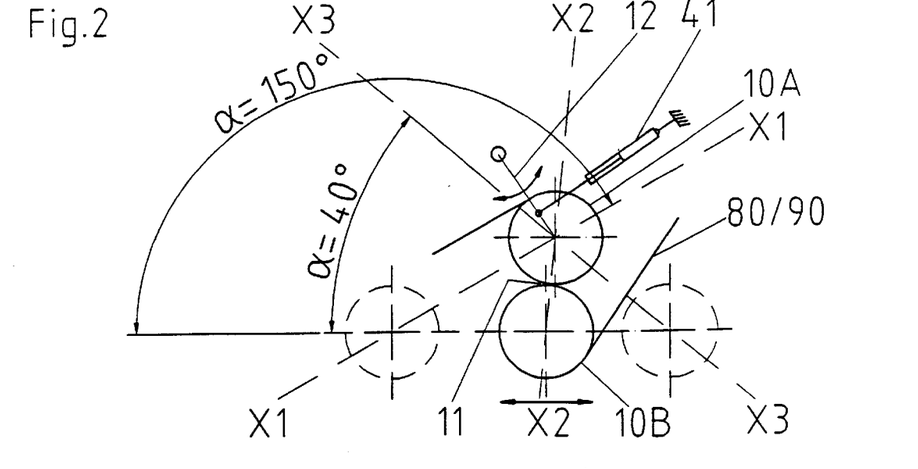
FIG. 2 is a schematic representation of the basic possible setting of the two rollers of a roller pair in relation to each other.
Figure 3:
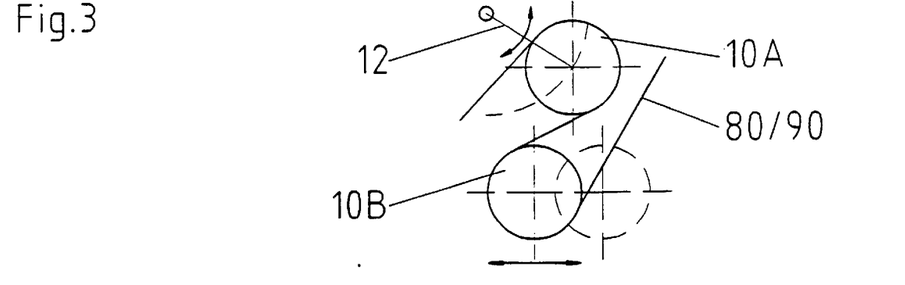
FIG. 3 is a lateral view of a further example with the inlet roller lifted off for canceling the pressing gap.

FIG. 2 shows the mode of functioning of the two rollers of a roller pair schematically by means of the example of the upper pressing roller 10A and the lower pressing roller 10B of the first roller pair 10. In the position of the two rollers 10A, 10B shown in solid lines they are essentially located above each other, i.e. the angle α ( not drawn in for this position) of the connecting line X2—X2 of the axes of these two rollers in respect to the horizontal (the frame 40 in FIG. 1) is approximately 90° here, the two positions of the lower pressing roller 10B shown in dashed lines indicate extreme positions, wherein the respective connecting lines X1—X1 or X3—X3 form an angle of 150° or 40° with the horizontal. Wrap angles of the two filter bands of more than 180° around both pressing rollers occur in the by far greatest adjustment range of these angles. The pivot arm 12 is only shown schematically here, as well as the device 41 in the form of a cylinder which acts with a force on the pivot arm 12, and in this way the upper pressing roller 10A can be pivoted on a section of an arc in the direction of the two-headed arrow, wherein the seating of the pivot arm 12 has been selected such that positions such as shown in FIG. 2 can be set by operating the pivot lever, wherein the upper pressing roller 10A is seated on the lower pressing roller 10B with practically a gap of 0, as well as positions, such as represented in FIG. 3, wherein the upper pressing roller 10A is lifted off the lower pressing roller 10B and therefore no pressing gap is defined anymore between these two rollers. In the last mentioned exemplary embodiment in accordance with FIG. 3, the positioning of the lower pressing roller 10B shown in dashed lines indicates that in such an operational case the displacement of the lower pressing roller 10B exclusively leads to a setting of the wrap angles of both rollers.

The suspended mounting, which can be force-defined, of the upper pressing roller 10A in connection with the essentially tangential displacement of the lower pressing roller therefore results in a multitude of relative positions of these two pressing rollers in respect to each other, with the possibility resulting therefrom of presetting in the simplest manner the combination of area pressing and linear pressing (pressing gap) required for every material to be pressed in every pressing stage.

Figure 4:
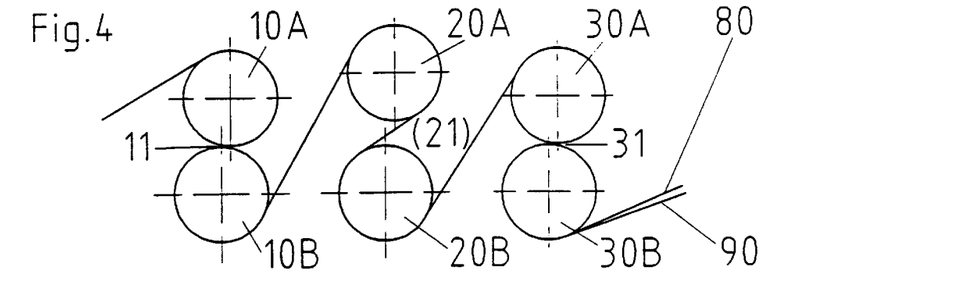
FIGS. 4 to 10 are lateral views of devices in accordance with the invention with at least two roller pairs and additional devices for dewatering.

In connection with FIGS. 4 to 10, only concrete examples of use and preferred exemplary embodiments of arrangements of pressing roller pairs in accordance with FIGS. 2 and 3 are provided:

FIG. 4 shows the arrangement of three pairs of pressing rollers (these could be the pressing roller pairs shown in the press in FIG. 1, for example), wherein in this case the two outer pressing roller pairs are operated with a minimal pressing gap, the center pressing roller pair 20A, 20B without a pressing gap; this arrangement represents a certain amount of careful treatment between the pressing roller 10B and the pressing roller 30A of the material to be pressed, since here only area pressing and kneading effects are exerted on the material to be pressed. In this connection the large wrap angles of more than 180° created by means of this arrangement should again be mentioned, as well as the "free", i.e. straight, filter band sections between the respective outlet roller of a pressing roller pair and the succeeding inlet roller of the next pressing roller pair.

Figure 5:
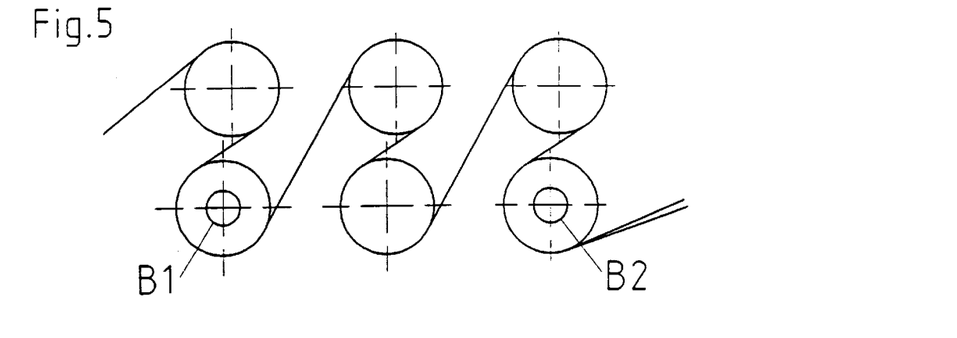

FIG. 5 represents a variant of the arrangement in accordance with FIG. 4, wherein no pressing gaps have been set, instead the first and last pressing roller pair is provided with a braking device B1, B2, which leads to an increase in the band tension and area pressing in the area of the center pressing roller pair.

Figure 6:
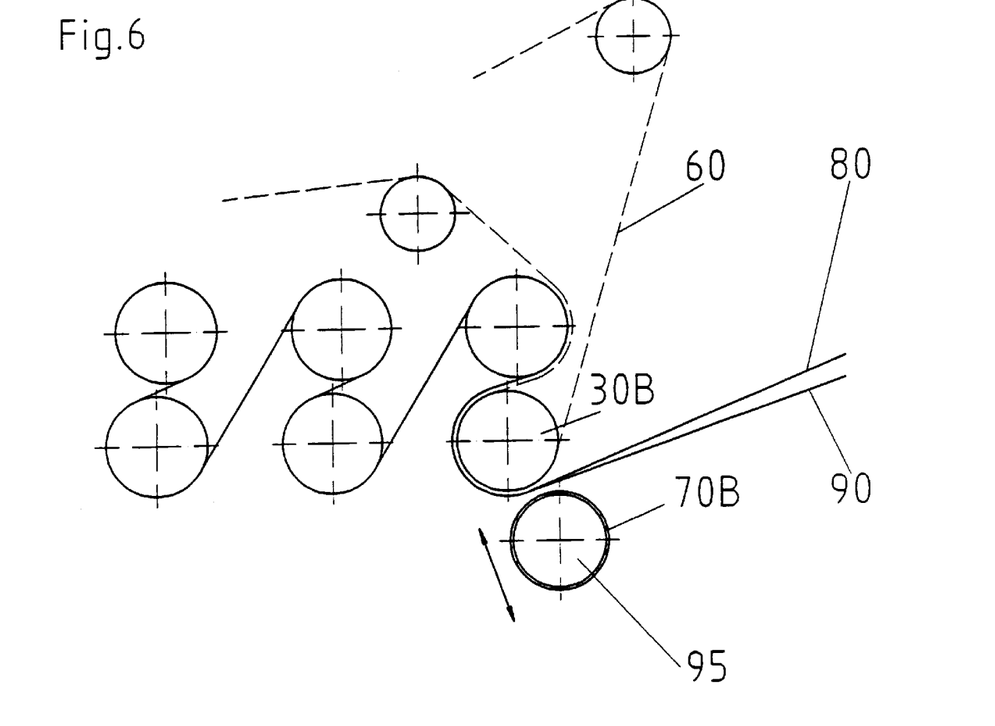

FIG. 6 shows the supplement of an arrangement of three pressing roller pairs by a drying band (also see FIG. 1) at the outlet side, which is guided on the last outlet roller 30B and in this way removes residual moisture from the top of the upper filter band 80. A drying roller 95, which can be pressed against the underside of the filter band 90, is pivotably seated (see FIG. 1) to remove residual moisture from the underside of the lower filter band 90. A drying band 70B, for example a felt coating, has been applied for this purpose to the drying roller 95.

Figure 7:
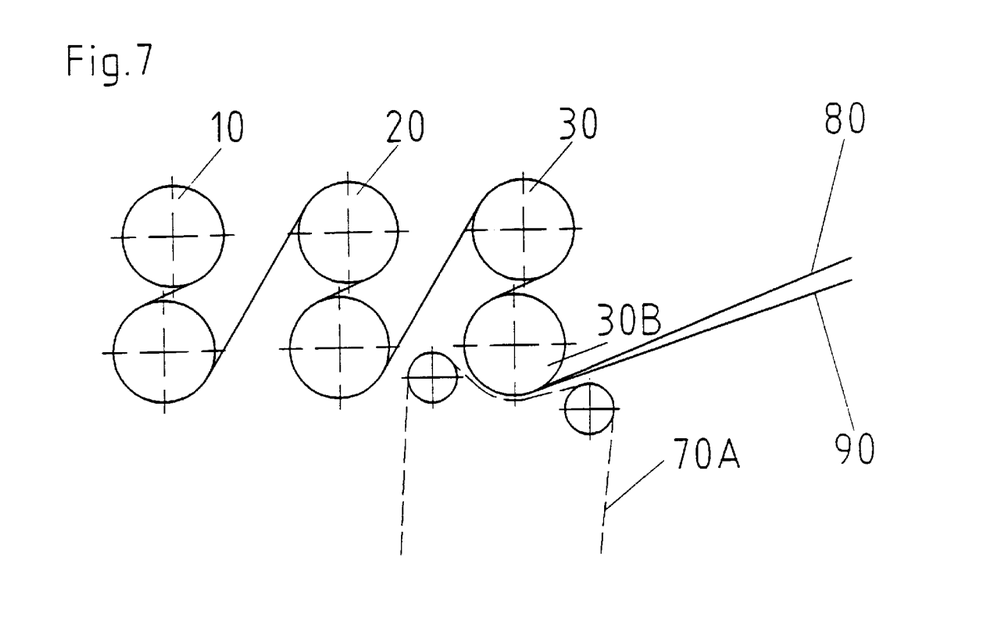

FIG. 7 shows a variant of the drying roller 95, namely a drying band 70A (for example a felt band), which is wrapped from below around a partial area of the outlet roller 30B with the aid of two reversing rollers, so that here drying over a larger area can take place in contrast to the essentially linear contact surface of the drying roller 95.

Figure 8:
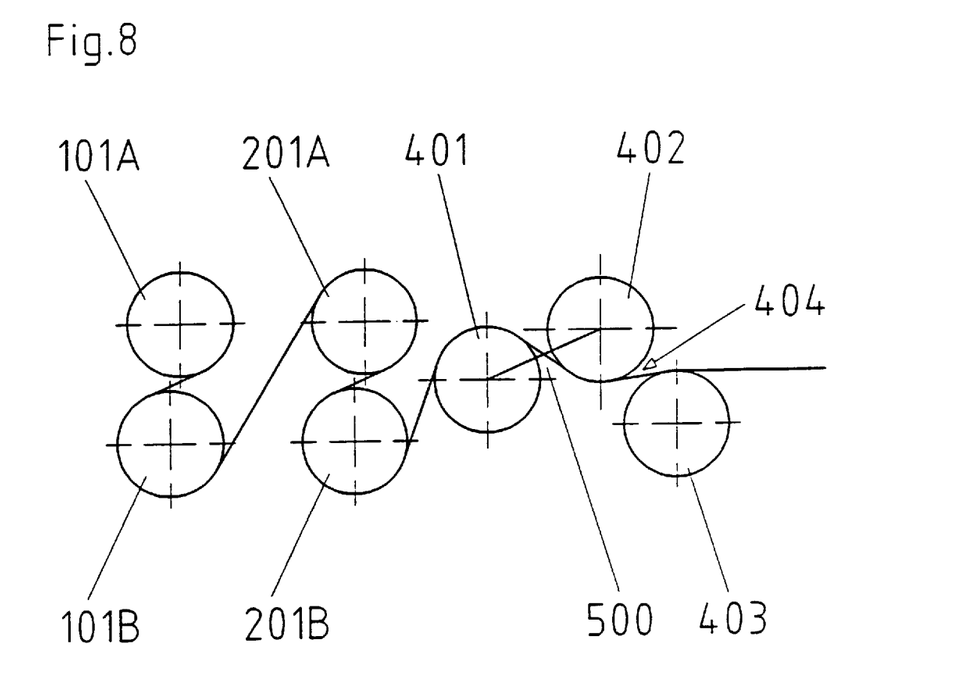
Figure 9:
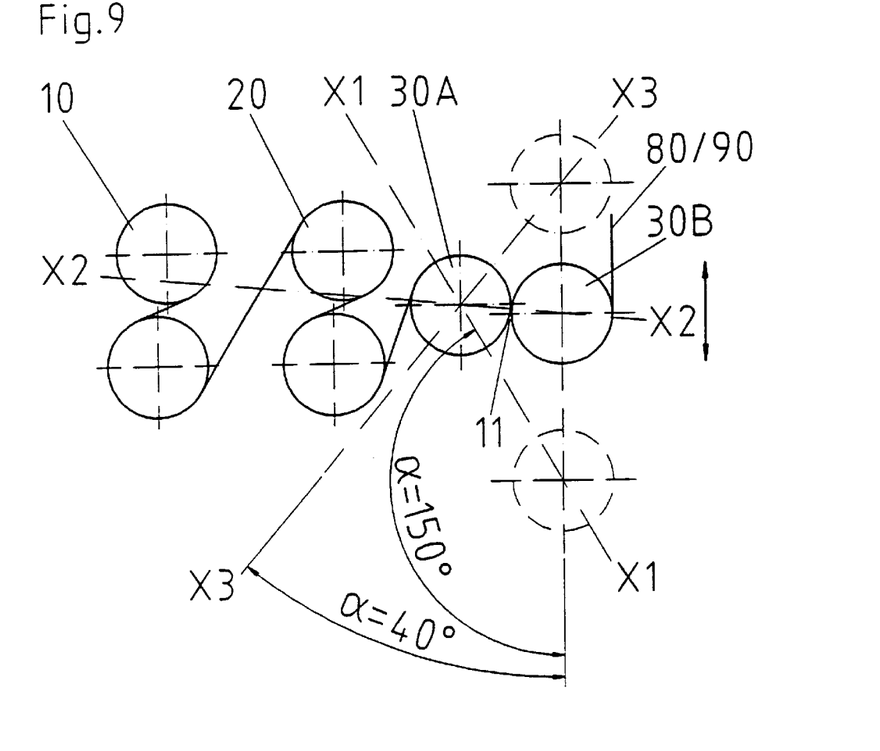

FIG. 8 shows an arrangement with two pressing roller pairs 101A, 101B, 201A, 201B, downstream of which three further pressing rollers 401, 402, 403 are placed, wherein the pressing rollers 401, 402 are held on a common pivot frame 500 (tandem roller) and the pressing roller 403 as the outlet roller can be separately displaced and in this way a further pressing gap 404 can be set, however, essentially without a wrap area of the filter band on the outlet pressing roller 403.

FIG. 9 again shows three pressing roller pairs wherein, however, in regard to the displacement direction of the outlet pressing roller 30B, the last pressing roller pair is tilted by 90° in respect to the axis of the first two pressing roller pairs 10, 20, so that the angles α, drawn in here in correspondence with FIG. 2, are drawn in relation to the vertical.

Figure 10:
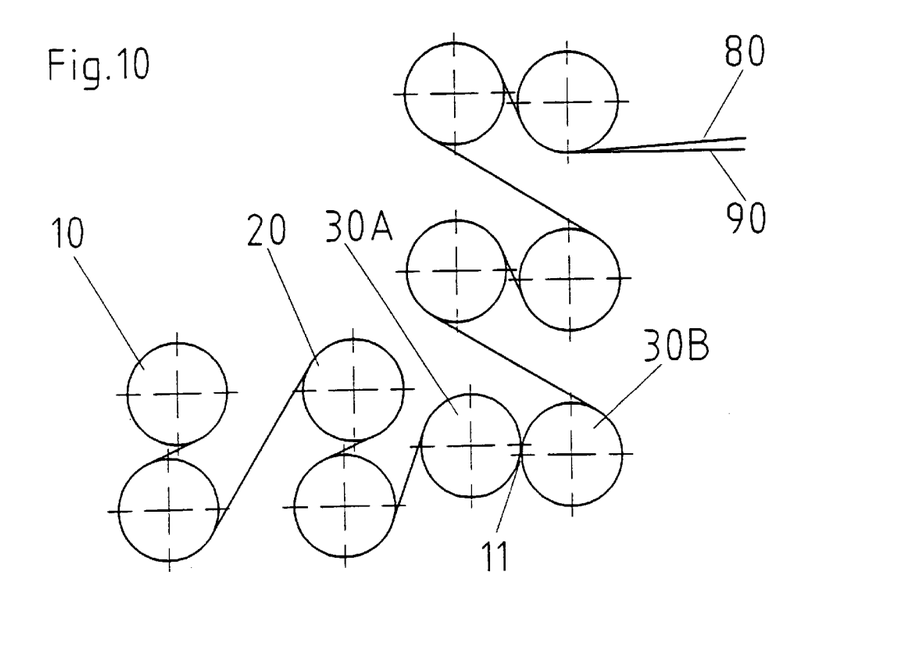

Finally, FIG. 10 shows an arrangement of five pressing roller pairs, the first two horizontally behind each other, the last three vertically above each other, an arrangement which assures a particularly compact structural shape along with a high degree of drying.

In connection with the representations of FIGS. 3 to 10, the axes and pivot arms and displacement guides are not drawn in, since various structural solutions offer themselves here, such as are known in the prior art.

Figure 11:
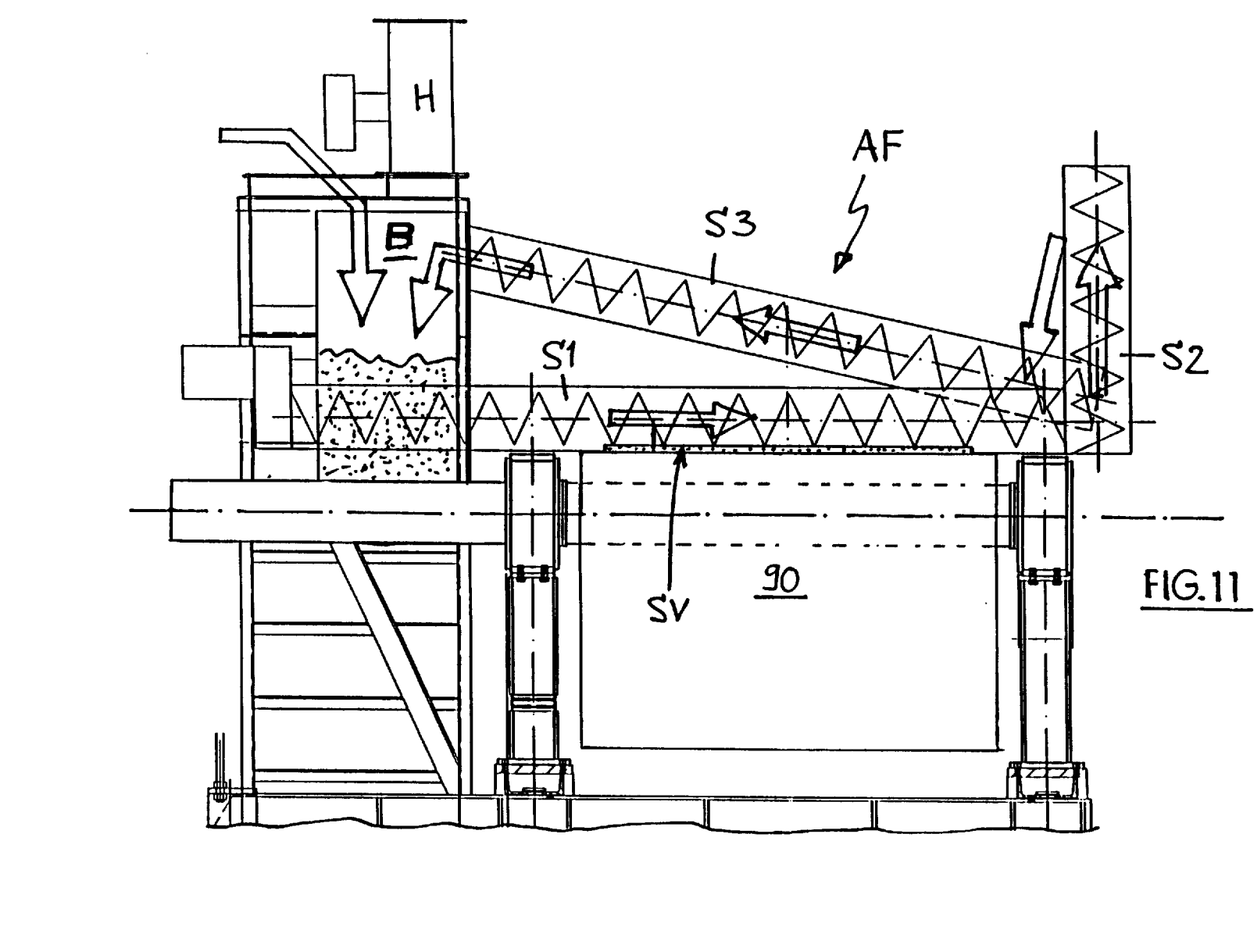
FIG. 11 is a front view of a press in the feeding area for the material to be pressed.

FIG. 11 shows a preferred embodiment of the feeding station AF: an arrangement of spiral conveyors S1, S2, S3 allows a cycle of the material to be pressed and to be placed on the lower filter band 90, which is filled into a container B, if necessary by way of a comminuting station (for example hammer mill H). The first spiral conveyor S1 is loaded from the container B and lies horizontally transversely above the filter band 90. A cylinder shell cutout SV is provided at the underside of the cylindrical shell, whose size or opening angle can be adjusted, by means of which the thickness on the filter band 90 of the layer of material to be pressed can be preset. The desired amount of material to be pressed is placed on the filter band in accordance with this setting. In the course of this the first spiral conveyor S1 is operated sufficiently fast so that the conveyed amount is greater than the amount fed to the filter band, so that a complete and even feeding of material to be pressed is assured. The excess amount of material to be pressed at the end of the feed opening SV is again fed to the container B via two further spiral conveyors S2, S3, so that to this extent a feed cycle is formed, which is symbolized in FIG. 11 by the arrows.

Figure 12:
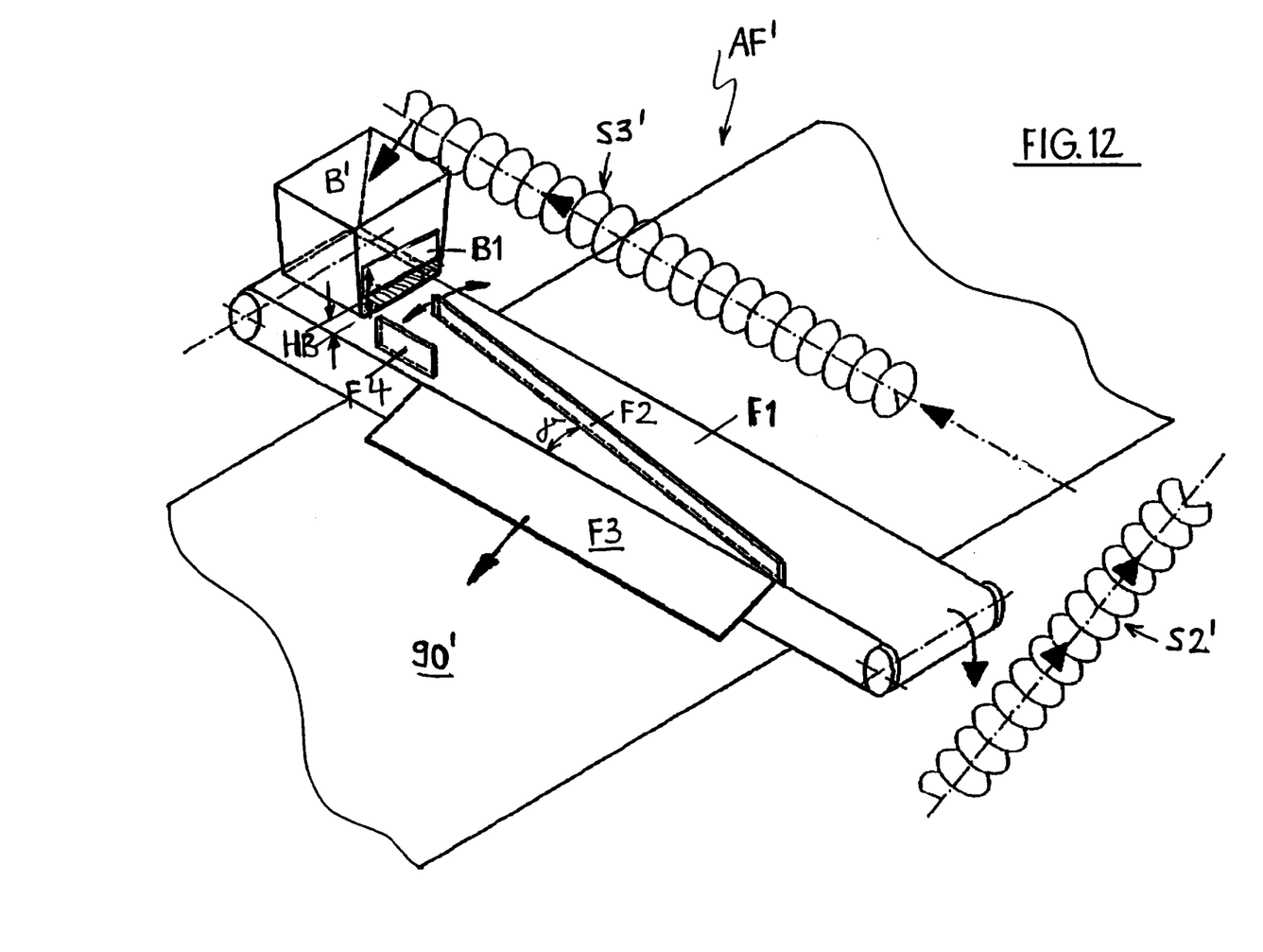
FIG. 12 is a perspective view of an alternative form of construction of the feeding area of a press according to the invention.

It is possible to employ other conveying units in place of spiral conveyors, for example a conveyor belt with stripping devices in place of the first spiral conveyor S1, such as represented in FIG. 12:

In FIG. 12, conveyor belt F1 is also located transversely to the conveying direction of the filter band 90'. The container B' is located at the feed end of the conveyor belt F1, and the material to be pressed is fed to the conveyor belt F1 via an opening on the bottom of the container B'. In this case the height HB of the opening is determined by means of an adjustable flap or shutter B1. A distributing panel F2 is pivotably held on the conveyor belt F1 in such a way that its opening angle γ can be adjusted in the direction toward the container B'. This opening angle γ and the opening height HB of the feed opening of the container B' together then determine the amount of material to be pressed which reaches the filter belt 90' via a delivery panel F3. Material to be pressed, which has passed behind the panel F2, then reaches the downstream connected spiral conveyors S2', S3', as in the above described exemplary embodiment, and is again fed into the container B'. A guide panel F4 is used to define the feeding width and prevents the placement of undesired portions of material to be pressed on the edge area of the filter band 90'.

We claim:

1. In a device for dewatering a suspension, which device includes a plurality of rollers and two filter bands for enclosing the suspension, the two filter bands being guided along an S-shaped path around the rollers so that each roller is contacted by one of the bands over a respective contact area, the improvement wherein:

said plurality of rollers comprise at least one pair of rollers composed of first and second rollers; and said device further comprises at least one displacement mechanism coupled to one of said rollers of said at least one pair, said displacement mechanism being movable to displace said one of said rollers of said at least one pair relative to the other one of said rollers of said at least one pair over a path to create a pressing gap of adjustable width between said first and second rollers and a pressing force of adjustable magnitude on the suspension, whereby movement of said displacement mechanism creates an adjustable relation between the dewatering produced in the pressing gap and the dewatering produced in the contact area wherein said displacement mechanism comprises a pivot arm supporting said first roller, means for applying a displacement force to said first roller, and means for applying a displacement force to said first roller for displacing said roller over said path, and wherein said filter bands are movable in a direction which causes successive portions of said bands to pass around said first roller before passing around said second roller, and said displacement mechanism further comprises means for effecting linear displacement of said second roller.

2. The device in accordance with claim 1 wherein said displacement mechanism is movable for displacing said one of said rollers relative to the other one of said rollers in order to vary the size of at least one contact area.

3. The device in accordance with claim 1 further comprising two frames between which said plurality of rollers are disposed, and said displacement mechanism is supported by one of said frames.

4. The device in accordance with claim 3 wherein said frames extend along mutually parallel planes, each of said rollers has an axis of rotation, a line between the axes of rotation of said rollers of said at least one pair forms an angle, α, with each plane, and said displacement mechanism is operable for displacing said one of said rollers over a path which causes the angle, α, to be set at any value between 30° and 160°.

5. The device in accordance with claim 4 wherein:

said at least one pair of rollers comprises a plurality of pairs of rollers;

said filter bands are guided around each pair of rollers in succession; and said at least one displacement mechanism comprises a plurality of displacement mechanisms each coupled to one of said rollers of a respective one of said pairs of rollers and each operable for independently displacing the one roller of its respective one of said pairs of rollers.

6. The device in accordance with claim 4 wherein said filter bands extend along a straight path portion between two of said pairs of roller.

7. The device in accordance with claim 5 wherein each of said displacement mechanisms is movable to create a spacing between said rollers of a respective pair of rollers, and the S-shaped path followed by said filter bands between said rollers of the respective pair of rollers has a straight section between said rollers when the spacing exists between said rollers.

8. The device in accordance with claim 5 wherein said plurality of pairs of rollers consists of three pairs of rollers including two outer pairs of rollers and a central pair of rollers between said two outer pairs of rollers, said rollers of said central pair of rollers are positioned to provide a spacing between said rollers of said central pair of rollers, and said device further comprises braking means coupled to one roller of each of said outer pairs of rollers.

9. The device in accordance with claim 1 wherein said filter bands are movable in a direction which causes successive portions of said bands to pass around said second roller, and said device further comprises a first movable drying band disposed for removing moisture from one of said filter bands while said filter bands are passing around said second roller.

10. The device in accordance with claim 9 further comprising a second movable drying band disposed for removing moisture from the other one of said filter bands while said filter bands are passing around said second roller.

11. The device in accordance with claim 10 further comprising a drying roller having an outer surface which carries said second movable drying band.

12. The device in accordance with claim 10 wherein at least one of said drying bands is a felt band.

13. The device in accordance with claim 1 wherein said device further comprises a feeding station disposed for supplying the suspension to said plurality of pairs of rollers, said feeding station comprising a hammer mill for effecting a preliminary dewatering of the suspension.

14. The device in accordance with claim 1 wherein said at least one pair of rollers comprises a plurality of pairs of rollers, each of said rollers has an axis of rotation, in each of said roller pairs, the axes of rotation extend along a line, and each line along which the axes of rotation of one roller pair extends is parallel to the line along which the axes of rotation of the rollers of every other roller pair extends.

15. The device in accordance with claim 1 wherein said at least one pair of rollers consists of two pairs of rollers, and said device further comprises two additional rollers disposed downstream of said two pairs of rollers with respect to the direction of travel of suspension through said device.

16. The device in accordance with claim 15 further comprising a connecting frame supporting said two additional rollers.

17. The device in accordance with claim 15 further comprising a third roller disposed downstream of said two additional rollers with respect to the direction of travel of the suspension through said device, said third roller constituting an outlet roller; and a lower frame supporting said third roller.

18. The device in accordance with claim 17 wherein said third roller is mounted to be displaced against one of said additional rollers to form a pressing gap through which said filter bands pass.

19. The device in accordance with claim 1 wherein said two filter bands contact at least one of said rollers over an angle of at least 180°.

20. The device in accordance with claim 1 wherein said device further comprises a feeding station disposed for supplying the suspension to said plurality of pairs of rollers, said feeding station comprising a plurality of conveyor units for applying suspension in an even layer having a predetermined thickness to one of said filter bands and for recirculating excess suspension.

21. The device in accordance with claim 20 wherein said conveyor units comprise a first spiral conveyor extending horizontally above said one of said filter bands, said first spiral conveyor including a cylindrical shell having a bottom portion, said cylindrical shell being provided with an adjustable cutout located at said bottom portion to provide an outlet opening from said first spiral conveyor.

22. The device in accordance with claim 21 wherein said feeding station further comprises a container for containing suspension to be dewatered, said first spiral conveyor being disposed for conveying suspension from said container; and a further spiral container disposed for returning excess suspension to said container.

23. The device in accordance with claim 20 wherein said conveyor units comprise a conveyor belt extending horizontally above one of said filter bands; and a stripping element disposed above said conveyor belt for controlling delivery of suspension to said filter bands.

24. The device in accordance with claim 23 wherein said feeding station further comprises a container for containing suspension to be dewatered, said container having an outlet opening of adjustable size.

25. The device in accordance with claim 23 wherein said filter bands are movable in a direction relative to said feeding station, said stripping element has an end which faces away from said container and said stripping element is mounted for pivotal movement about the end which faces away from said container to vary an angle between said stripping element and the direction in which said filter bands are movable.

* * * * *